(12) United States Patent
Martens et al.

(10) Patent No.: US 6,301,327 B1
(45) Date of Patent: Oct. 9, 2001

(54) METHOD AND APPARATUS FOR EXAMINING LUGGAGE BY X-RAY SCANNING

(75) Inventors: Gerhard Martens, Henstedt-Ulzburg; Horst Peemöller, Hamburg; Bernd Geistmann, Pinneberg; Hans-Detlef Dau, Hamburg, all of (DE)

(73) Assignee: YXLON International X-Ray GmbH, Hamburg (DE)

( * ) Notice: Subject to any disclaimer, the term of this patent is extended or adjusted under 35 U.S.C. 154(b) by 0 days.

(21) Appl. No.: 09/388,711

(22) Filed: Sep. 2, 1999

(30) Foreign Application Priority Data

Sep. 4, 1998 (EP) ................................................. 98116760
Jul. 7, 1999 (EP) ................................................. 99113102

(51) Int. Cl.$^7$ .................................................... G01N 23/04
(52) U.S. Cl. ................................................ 378/57; 378/58
(58) Field of Search ....................................... 378/57, 58

(56) References Cited

U.S. PATENT DOCUMENTS 3,790,799 * 2/1974 Stein et al. .
4,618,772 * 10/1986 Haas et al. .
5,642,393 * 6/1997 Krug et al. ............................. 378/57

FOREIGN PATENT DOCUMENTS

0311177 * 12/1989 (EP) .

* cited by examiner

Primary Examiner—Craig E. Church
(74) Attorney, Agent, or Firm—Friedrich Kueffner

(57) ABSTRACT

A method and an apparatus for examining luggage by X-ray scanning, wherein the pieces of luggage to be examined are moved on a conveyor belt into a scanner which contains the X-ray components, i.e., an X-ray unit and a detector unit. The scanner together with the X-ray unit and the detector unit is moved over the piece of luggage which stands still. After each scanning process, the piece of luggage is moved on the conveyor belt in a timed manner and the step of scanning the piece of luggage is repeated.

5 Claims, 5 Drawing Sheets

METHOD AND APPARATUS FOR EXAMINING LUGGAGE BY X-RAY SCANNING

BACKGROUND OF THE INVENTION

1. Field of the Invention

The present invention relates to a method and an apparatus for examining luggage by X-ray scanning, wherein the pieces of luggage to be examined are moved on a conveyor belt into a scanner which contains the X-ray components, i.e., an X-ray unit and a detector unit.

2. Description of the Related Art

Apparatus of the above-described type are known in various configurations. They are used for automatically examining luggage, particularly at airports. For this purpose, the apparatus are integrated into the luggage conveying and handling system of the respective airport. This results in basic requirements concerning dimensions and examination speeds.

In the X-ray scanning method used in connection with the present invention, the X-rays which emanate from an X-ray tube are scattered by the contents of the piece of luggage being examined. This scattered signal is received by a detector and is processed by a subsequently connected electronic unit. The measured spectrum is an indication for the substance contained in the piece of luggage. The measured signal is compared to signals stored in a data bank. If there is a match, an alarm will be given.

There are basically various methods for completely scanning the piece of luggage. In practice, a strip having a width of approximately 5 cm can be scanned in each scanning process. Consequently, when a piece of luggage is large, a plurality of individually scanned strips are used for generating the total picture. This requires a corresponding amount of time.

The piece of luggage is being moved on a conveyor belt. When the X-ray/detector unit is stationary, the piece of luggage must be moved relative to the scanner, for example, in a meander-shaped configuration, between the X-ray tube and the detector in order to carry out scanning with the necessary strip units. For this purpose, the actual conveying unit and the movement of the piece of luggage must be interrupted and changed. This is not acceptable in the case of luggage at airports because each individual piece of luggage would have to be moved, not only in the conveying direction, but also back and forth.

SUMMARY OF THE INVENTION

Therefore, it is the primary object of the present invention to provide a method and an apparatus of the above-described type which meet the requirements with respect to examination speed and examination accuracy without unacceptably hindering the flow of the luggage and which make it possible to have a configuration of the entire apparatus which is as compact as possible.

In accordance with the present invention, it is not the piece of luggage which is moved during the scanning process; rather, the scanner together with the X-ray/detector unit is moved over the piece of luggage which stands still. After each scanning process, the piece of luggage is moved on the conveyor belt in a timed manner and the step of scanning the piece of luggage is repeated.

Consequently, during each movement of the scanner, i.e., the forward movement and the return movement of the scanner, a strip of the piece of luggage is scanned. This process is repeated in dependence on the dimensions of the piece of luggage, so that the strips can then be combined to form the scanned image of the entire piece of luggage. The times during which the piece of luggage stands still are very short because the scanner can be moved very quickly and very accurately over the piece of luggage.

It is basically possible to carry out either a straight movement of the scanner essentially perpendicularly of the conveying direction of the piece of luggage, or a swivelling movement is carried out in the manner of a windshield wiper or along a circular arc. The latter manner of movement has the advantage that the apparatus can have very narrow dimensions. The swivel axis is located either laterally next to the conveyor belt or the axis extends through the center of the conveyor belt.

In accordance with a particularly advantageous feature, the scanning axis, i.e., the axis extending between the X-ray unit and the detector unit, is inclined relative to the plane of the conveyor belt, wherein the inclination exists advantageously transversely of the conveying direction as well as in the conveying direction. This makes it possible to scan even thin objects in the piece of luggage which have been arranged vertically or exactly horizontally relative to the conveying direction in an attempt to prevent detection. This can be achieved in different ways, for example, by inclining the carriage and, thus, a corresponding inclination of the scanner, or by inclining the swivel axis depending on which method is being selected and which device is being used.

In order to operate as quickly and efficiently as possible, a scanning process is carried during each movement of the scanner, i.e., during every forward and backward movement of the scanner over the piece of luggage.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
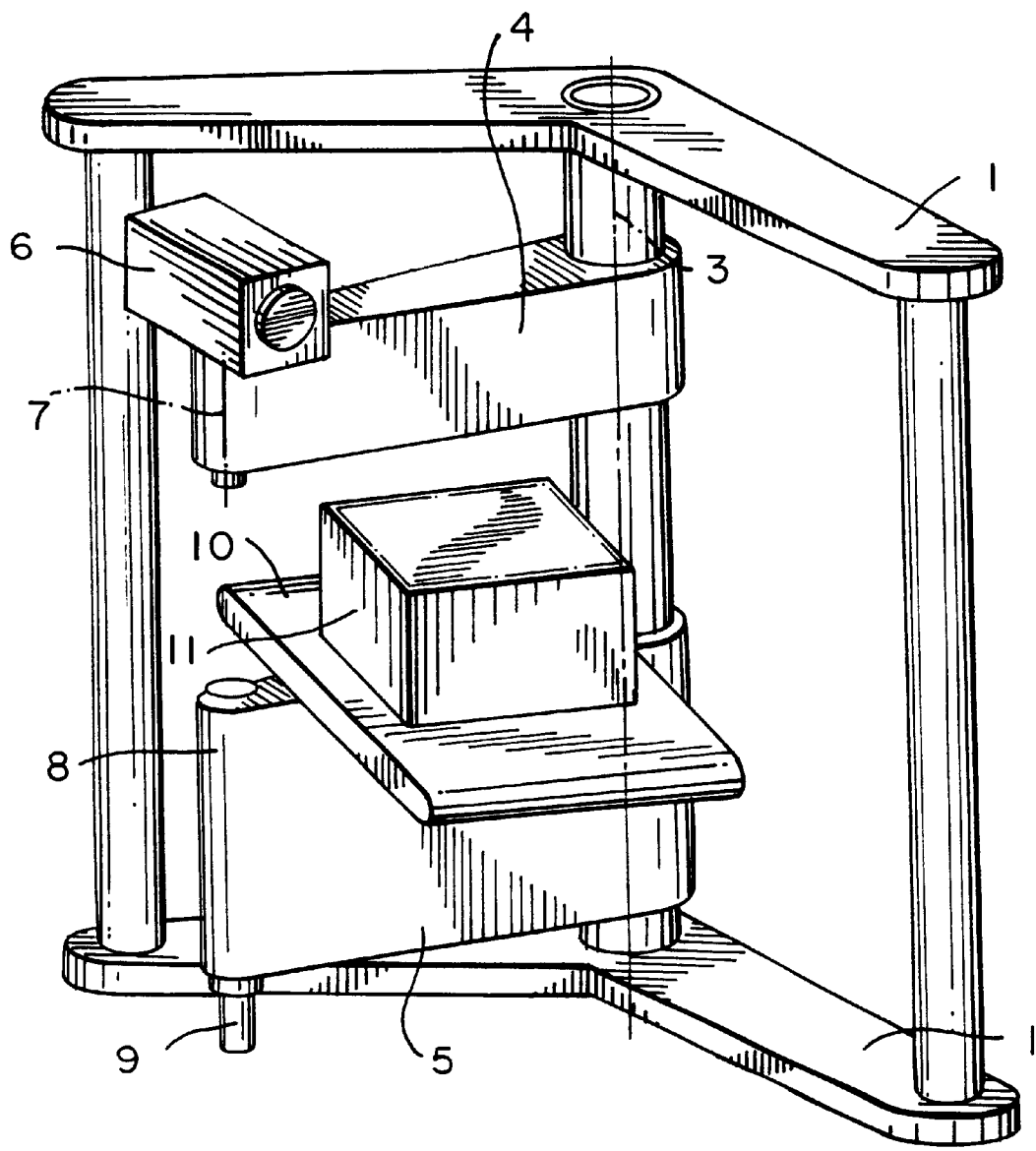
FIG. 1 is a schematic perspective view showing the essential components of a first embodiment of an apparatus for carrying out the method according to the present invention.
Figure 2:
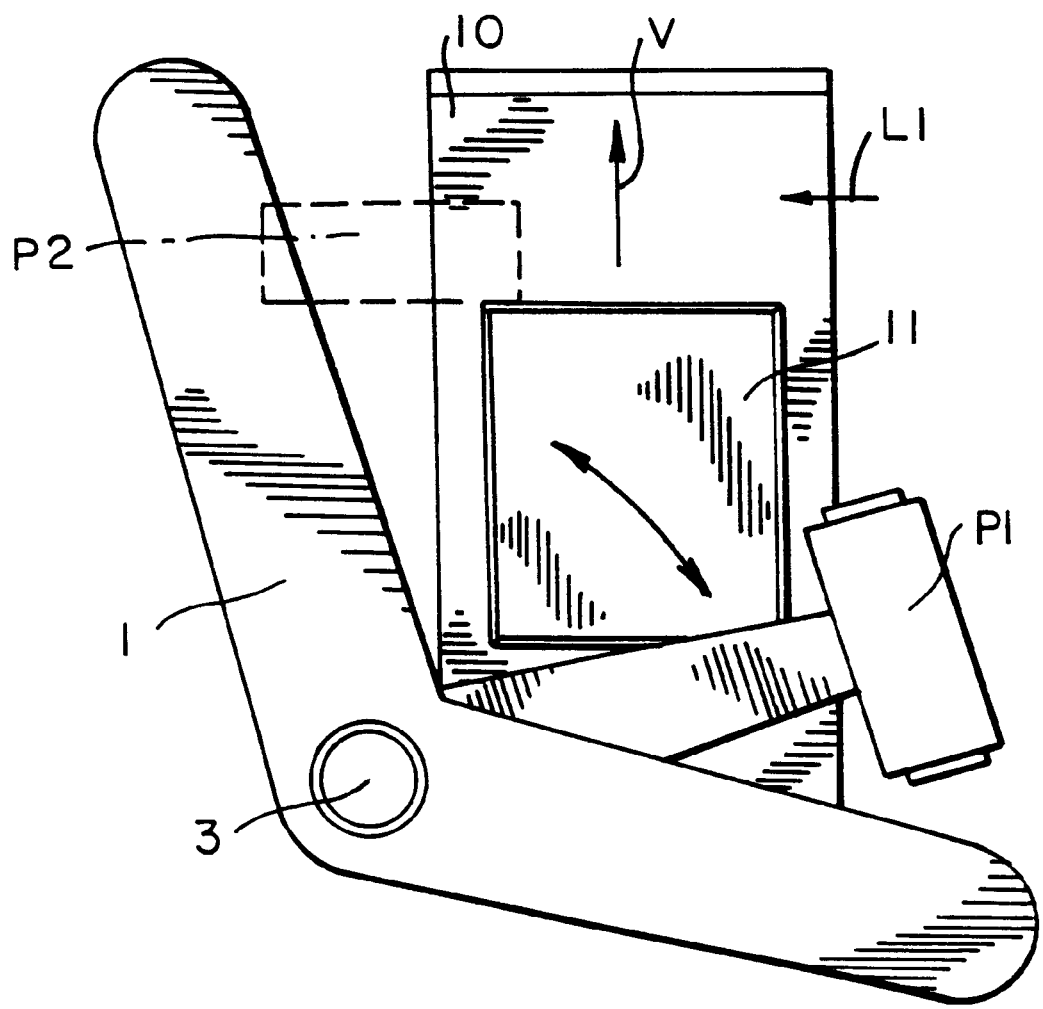
FIG. 2 is a top view of the embodiment of FIG. 1.

FIGS. 1 and 2 of the drawing show a first embodiment of the apparatus according to the present invention with a swivel axis for the scanner located laterally next to the conveyor belt 10.

Figure 3:
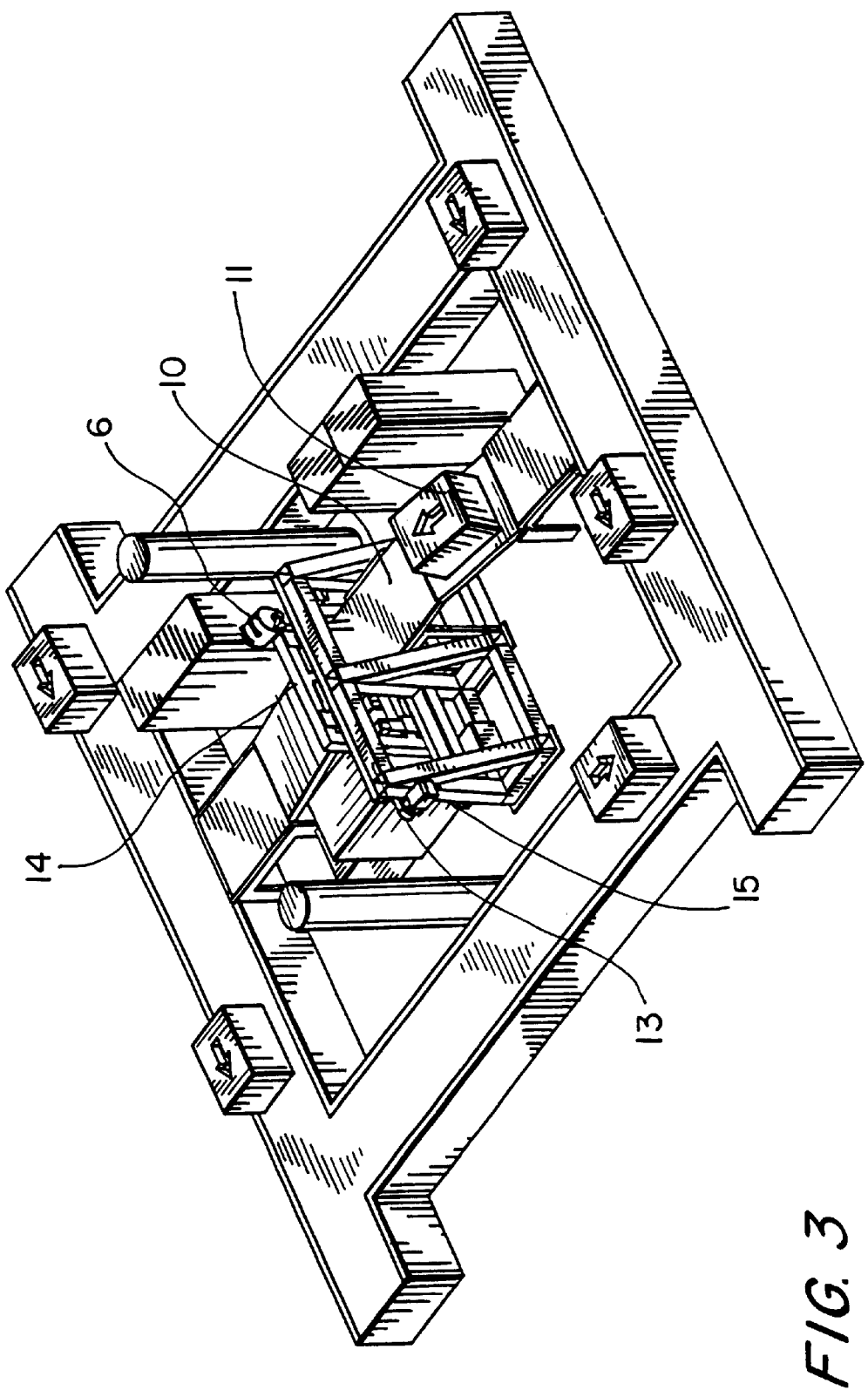
FIG. 3 is a perspective view of a second embodiment of the apparatus of the present invention.
Figure 4:
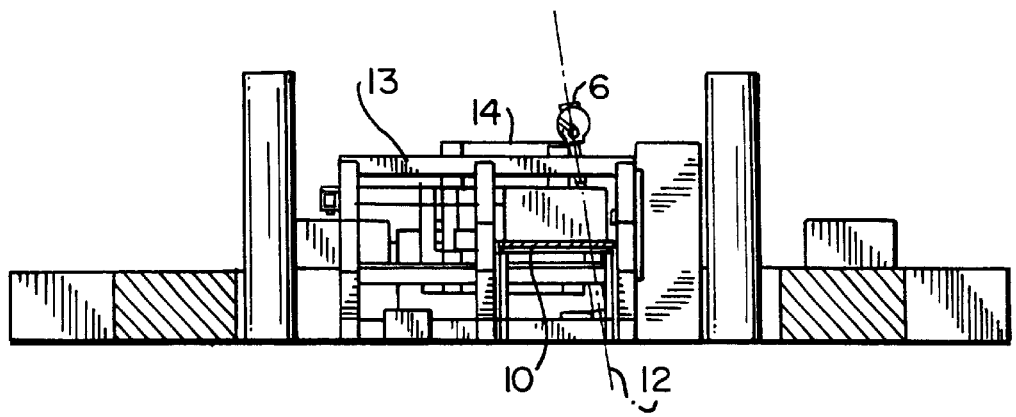
FIG. 4 is a transverse sectional view of the embodiment of FIG. 3.
Figure 5:
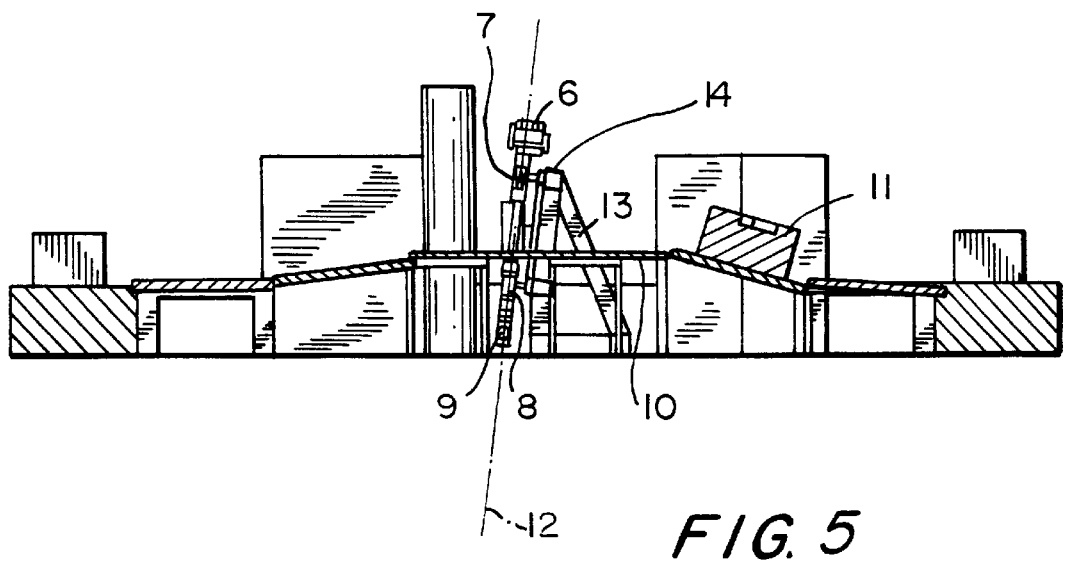
FIG. 5 is a longitudinal sectional view of the embodiment of FIG. 3.

FIGS. 3 to 5 show an embodiment in which the scanner is moved on a carriage transversely of the conveying direction over the piece of luggage to be examined.

Equivalent components are provided with the same reference numerals.

In FIGS. 1 and 2, which show the first embodiment, a conveyor belt 10 is illustrated schematically. A piece of luggage is denoted by reference numeral 11. A plurality of pieces of luggage are moved continuously on the endless conveyor belt 10 into the apparatus.

A frame construction 1 forming an angle serves as the support for the scanner and ensures the required stability.

The scanner is composed of an X-ray unit 4 and a detector unit 5. The X-ray unit 4, arranged above the conveyor belt 10 and the piece of luggage 10, is composed of an X-ray tube 6 and a primary collimator 7. Located below the conveyor belt 10 are the secondary collimator 8 and the detector 9. The scanner formed by the X-ray unit and the detector unit 5 can be swivelled about the center axis 3 of the frame construction 1. The center axis 3 extends perpendicularly of the plane of the conveyor belt 10.

When the piece of luggage is moved into the apparatus, the scanner is in a starting position which is indicated by P1 in FIG. 2. The piece of luggage 11 to be examined is moved until the drive V is stopped by a signal of a light barrier L1. Subsequently, the scanning movement, i.e., the swivelling movement in the manner of a windshield wiper over the piece of luggage, is started. The scanner is moved from the position P1 into the position P2 in which the scanner is shown in broken lines. This process scans a strip having a width of about 5 cm.

After the position P2 has been reached, the conveyor belt 10 is once again advanced forwardly by 5 cm in accordance with arrow V. Subsequently, another scanning process is carried out from position P2 to position P1. Using this forward and backward movement, the entire piece of luggage is scanned and examined. A computer evaluates the produced signals.

In FIGS. 1 and 2 of the drawing, the swivel axis 3 extends vertically, i.e., the swivel axis 3 extends perpendicularly of the plane of the conveyor belt 2. When the swivel axis 3 is inclined relative to the conveyor plane of the conveyor belt 10, it is also possible to examine thin or flat objects in the piece of luggage 10 which are placed vertically or horizontally relative to the conveyor plane.

Figure 1A:
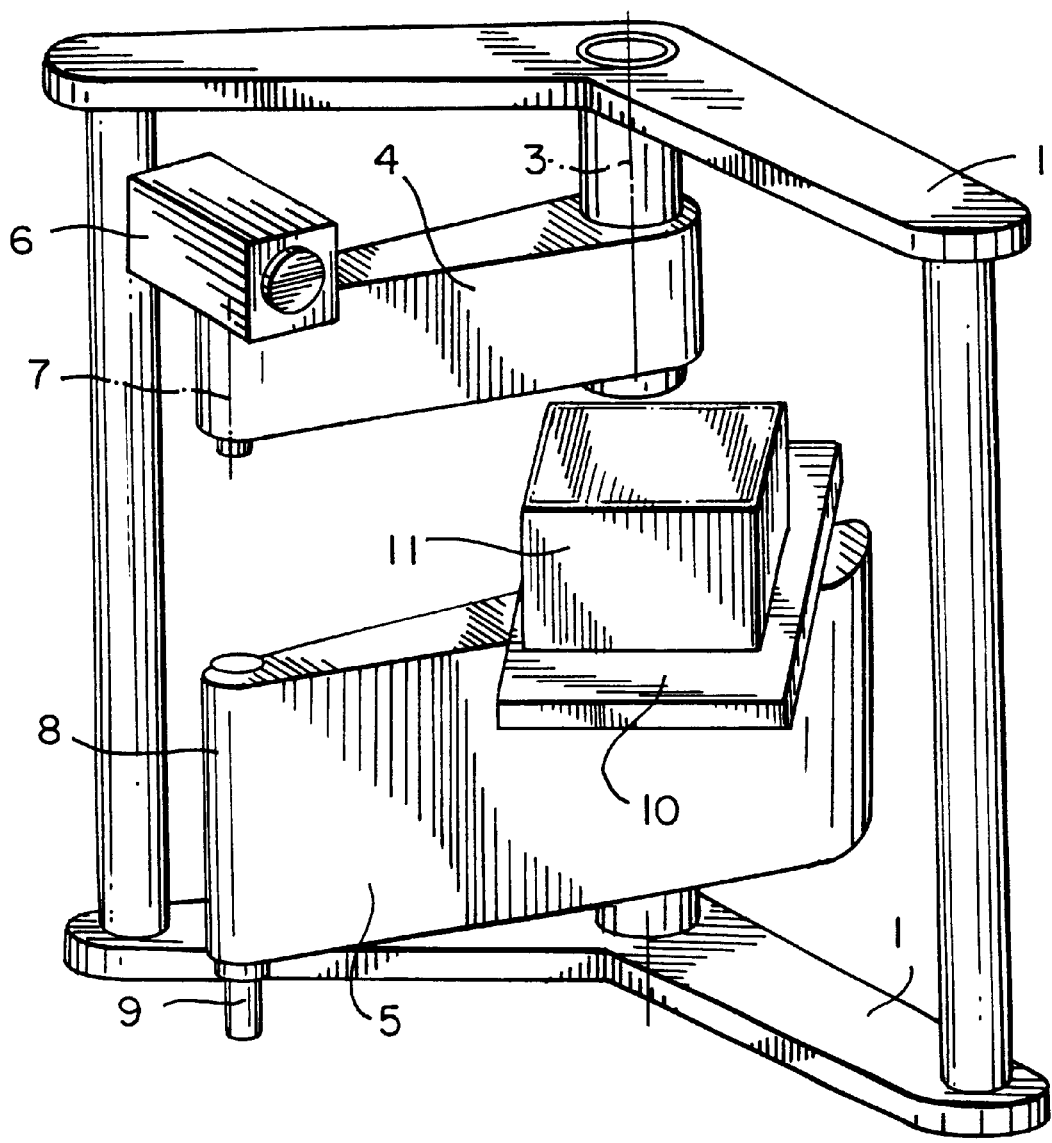
FIG. 1a is a schematic perspective view of a modified apparatus according to the invention.

In accordance with a modified embodiment, illustrated in FIG. 1a, a frame is used through which the conveyor 10 is moved. In this modified embodiment, the swivel axis is located approximately in the middle of the conveyor plane, i.e., the shaft 3 which supports the scanner is interrupted, so that the conveyor belt can be moved through. In this modified embodiment, the scanner carries out a symmetrical circular arc-shaped movement relative to the conveyor plane, i.e., the center point of the swivelling movement is located on the center axis of the conveyor belt.

In the embodiment of FIGS. 3 to 5, a stationary three-dimensional frame 13 is provided on which a carriage 14 is moveable back and forth transversely of the conveying direction of the conveyor belt 10 and, thus, transversely of the direction of movement of the pieces of luggage 11. The scanner is fastened to the carriage 14. The X-ray tube 6, the primary collimator 7, the secondary collimator 8 and the detector 9 are illustrated in FIG. 5.

It can also be seen in FIGS. 4 and 5 that the plane of the frame 13 in which the carriage 14 is moveable, i.e., the plane of movement of the carriage perpendicularly of the conveyor plane of the conveyor belt 10, is inclined. In FIG. 4, the inclination is in one direction, while in FIG. 5 the inclination is another direction. This inclination of the scanning axis 12 which extends through the X-ray unit and the detector unit ensures that even those thin objects in the piece of luggage 11 are detected which are arranged vertically or horizontally relative to the conveyor plane. The drive motor for the carriage 14 is denoted by 15.

The apparatus according to FIGS. 3 to 5 otherwise operates in the same manner as described above in connection with the embodiment of FIGS. 1 and 2. When the scanner is moved over the stationary piece of luggage 11, an examination strip is recorded. Before the return movement of the scanner begins, the piece of luggage is advanced accordingly. The individual strips produced in this manner are then combined to form the total examination image of the contents of the piece of luggage.

While specific embodiments of the invention have been shown and described in detail to illustrate the inventive principles, it will be understood that the invention may be embodied otherwise without departing from such principles.

We claim:

1. An apparatus for examining a piece of luggage by X-ray scanning, the apparatus comprising a scanner comprising an X-ray unit and a detector unit and a conveyor belt for moving the piece of luggage to be examined into the scanner, the apparatus further comprising means for swivelling the scanner about an axis extending perpendicularly of a conveyor plane such that the scanner carries out a circular arc-shaped swivelling movement over the piece of luggage for carrying out a scanning procedure, and means for stopping the movement of the conveyor belt with the piece of luggage when a scanning procedure begins and for repeating the scanning procedure in a timed manner in dependence on dimensions of the piece of luggage.

2. The apparatus according to claim 1, wherein a, scanning axis of the scanner between the X-ray unit and the detector unit is inclined relative to a vertical direction.

3. The apparatus according to claim 2, wherein the swivel axis of the scanner is inclined relative to the vertical direction.

4. The apparatus according to claim 1, wherein the scanner is mounted on a frame construction forming an angle, and wherein the swivel axis of the scanner forms a center axis of the frame construction.

5. The apparatus according to claim 4, wherein the swivel axis extends approximately through a center of the conveyor belt.

* * * * *